INVENTOR.
HERBERT J. SETZER
ALFRED C.W. EGGEN

BY

*Charles A. Warren*

ATTORNEY

United States Patent Office
3,450,500
Patented June 17, 1969

3,450,500
METHOD FOR CATALYTICALLY REFORMING HYDROGEN-CONTAINING CARBONACEOUS FEEDSTOCKS BY SIMULTANEOUS ABSTRACTIONS THROUGH A MEMBRANE SELECTIVELY PERMEABLE TO HYDROGEN
Herbert J. Setzer, Ellington, and Alfred C. W. Eggen, Manchester, Conn., assignors to United Aircraft Corporation, East Hartford, Conn., a corporation of Delaware
Continuation-in-part of application Ser. No. 476,878, Aug. 3, 1965. This application Mar. 14, 1968, Ser. No. 716,276
Int. Cl. C01b 1/00; B01j 9/00
U.S. Cl. 23—212
5 Claims

ABSTRACT OF THE DISCLOSURE

There is disclosed a process for catalytically converting a mixture of a hydrogen-containing carbonaceous feedstock and steam into a product hydrogen stream of high purity at relatively low temperatures wherein the catalytic conversion is effected in close proximity to a membrane of a metal selectively permeable to hydrogen so that hydrogen formed by conversion is simultaneously abstracted to drive the equilibrium to favor increased hydrogen production.

Reference to related applications

The present application is a continuation-in-part of our copending application, Ser. No. 476,878 filed August 3, 1965, and now abondoned.

Background of the invention

Because of a desire to produce electric current from relatively small power plants, there have been considerable efforts in the area of fuel cells wherein the energy generated by an oxidation-reduction chemical reaction at spaced electrodes is directly converted into electrical energy to operate devices in an external circuit between the electrodes which provide a load. Although some fuel cells have been proposed which utilize relatively impure hydrogen or other oxidizable fuels, generally pure hydrogen has been recognized as the preferred fuel and its coreactant has generally been oxygen or the oxygen in air.

Although various techniques have been proposed for converting hydrocarbons and other hydrogen-containing carbonaceous feedstocks into hydrogen for use in such cells, generally primary emphasis has been placed upon catalytic conversion at relatively high temperatures, i.e. above 700° centigrade. Passage of the resultant gas stream through purifiers employing such means as palladium membranes which are selectively permeable to hydrogen has been employed to minimize the impurities which might contaminate the fuel cell electrolyte which is generally alkaline.

More recently, it has been suggested that the utilization of a membrane of a metal selectively permeable to hydrogen could be utilized to abstract hydrogen from a catalytic reaction site and thus favor increased hydrogen production. Suggestions of such processes are to be found in Hunter United States Patent 3,254,956; Pfefferle United States Patents 3,198,604; 3,251,652; 3,278,268; 3,290,406; Faris et al. United States Patent 3,259,523; and British Patent 981,275. However, utilization of the suggestions of those patents relating to the conversion of carbonaceous feedstocks would produce units which would be costly to operate and/or which would have a short life and/or which would have only somewhat improved efficiency of operation.

It is an object of the present invention to provide a novel and relatively highly efficient method for producing substantially pure hydrogen from hydrogen-containing carbonaceous feedstocks which is relatively rapid and adapted to relatively compact apparatus.

It is also an object to provide such a method for producing hydrogen from hydrocarbonaceous feedstocks which utilizes relatively low conversion temperatures while providing relatively high conversion efficiencies and affording attendant advantages of longer catalyst life, permissibly lower ratios of water to feedstock carbon, and reduction in problems of equipment fabrication and operation.

Summary of the invention

It has now been found that the foregoing and related objects and advantages may be readily attained in a process wherein a gaseous stream comprising a mixture of a hydrogen-containing carbonaceous feedstock and steam is passed into contact with a bed of granular dehydrogenation catalyst for the feedstock disposed about one surface of a tubular membrane formed from a metal selectively permeable to hydrogen. The conditions prevailing in the catalyst bed are sufficient to dehydrogenate an appreciable portion of the feedstock and include a molar ratio of steam to carbon of about 2.0–4.0:1.0, a temperature of about 175–515° centigrade, a pressure of about 0.5000 p.s.i.a. and a space velocity of about 100–10,000 hours$^{-1}$. The distance between any point in the granular catalyst in the bed to the adjacent surface of the membrane is not greater than about 0.25 inch to facilitate rapid diffusion to and through the membrane, and the temperature is selected with respect to the metal of the membrane to minimize thermal deterioration thereof.

Additional quantities of the gaseous stream of the mixture are supplied to the bed of catalyst to produce continuing catalytic dehydrogenation of the hydrogen-containing carbonaceous feed-stock therein with the hydrogen produced thereby diffusing through the wall of the membrane to the other surface thereof. Substantially pure hydrogen is removed from the other surface of the membrane to keep the pressure of hydrogen thereat below that at the surface of the membrane adjacent the catalyst bed, and the withdrawal and continuing diffusion shift the equilibrium of reaction in the catalyst about the membrane so as to favor increased hydrogen production even at the low temperatures of operation.

The term "dehydrogenation catalyst" as used herein refers to a steam reforming catalyst of the type which will reform hydrogen-containing carbonaceous feedstocks to products including hydrogen such as steam reforming catalysts of the nickel, cobalt and platinum types and nickel catalysts for ammonia. The term "granular catalyst" as employed herein refers to participate catalysts such as powders, compacts, sinters and other discrete masses.

In accordance with the present invention, a reaction chamber may be utilized and contain tubes selectively permeable to hydrogen. The tubes may have the dehydrogenation catalyst therewithin with the gaseous stream being passed through the tubes and the hydrogen evolved passing through the tube walls to a collection chamber from which it is withdrawn. In another arrangement, a vessel may be used providing a reaction chamber with an inlet and an outlet at spaced points therein and the tubes extend in sealed relationship within the chamber between the inlet and outlet and have an end opening outwardly of the reaction chamber. In this embodiment, the bed of catalyst is disposed about the outer periphery of the tubes and the gaseous stream passes through the reaction chamber from inlet to outlet in contact with the catalyst so that the hydrogen evolved diffuses through the tube walls to the interior thereof from which it is withdrawn through the ends thereof.

Detailed description of the illustrated embodiments

Figure 1:
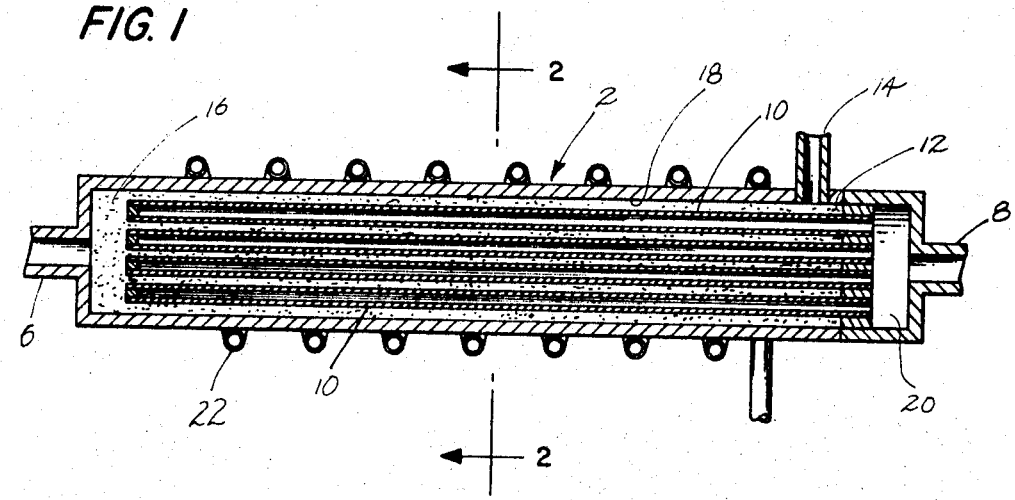
FIGURE 1 is a partially diagrammatical longitudinal sectional view of a conversion apparatus embodying the present invention.
Figure 2:
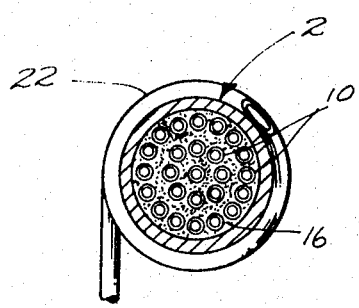
FIGURE 2 is a partially diagrammatical transverse sectional view of the apparatus of FIGURE 1.

Referring now in detail to the attached drawings, FIGURES 1 and 2 illustrate partially diagrammatically one embodiment of apparatus in accordance with the present invention. A cylindrical reaction vessel generally designated by the numeral 2 has an inlet 6 at one end and an outlet 8 at the opposite end. A multiplicity of relatively small diameter, hollow cylindrical tubes 10 formed from a metal selectively permeable to hydrogen are sealed at the end adjacent the inlet 6 and are open and supported at their opposite end in a tube sheet or header 12 adjacent the outlet 8. The vessel 2 is also provided with a process stream outlet 14 adjacent the tube sheet 12, and finely divided grandular catalyst 16 is packed within the reaction chamber 4 about the tubes 10. As can be seen, the tube sheet or header 12 partitions the cavity within the vessel 2 into a reaction chamber 18 and a collection chamber 20 into which the tubes 10 open. Heat is supplied to the vessel tube by the heating coils 22.

In operation of the apparatus, a gaseous mixture of water and hydrocarbonaceous feedstock preheated to the bed temperature is introduced through the inlet 6 and passes through the catalyst 16 about the tubes 10. Under the influence of the catalyst, the hydrocarbonaceous feedstock reacts with the water vapor to produce hydrogen and carbon oxide products. The hydrogen formed in the reaction which comes into contact with the outer peripheral surface of the tubes 10 diffuses through the wall thereof into the interior and thence passes into the collection chamber 20 from which it is drawn through the outlet 8. As will be readily appreciated, the pressure of hydrogen within the tubes 10 should be at differential with respect to the pressure on the exterior surface of the tubes to facilitate the hydrogen abstraction from the reaction site. As the partial pressure of hydrogen in the reaction product is decreased, the dehydrogenation reaction equilibrium shifts to favor increased hydrogen production until a limiting value is reached.

Figure 3:
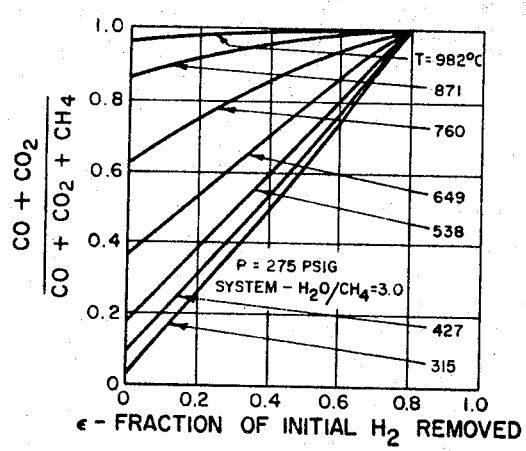
FIGURE 3 is a first graph showing the effect of the present invention on the efficiency of hydrogen production.

FIGURE 3 of the attached drawing graphically presents the effect of continuous isothermal abstraction in a family of isothermal curves for a water/methane ratio of 3.0 and a pressure of 275 pounds per square inch gauge.

Figure 4:
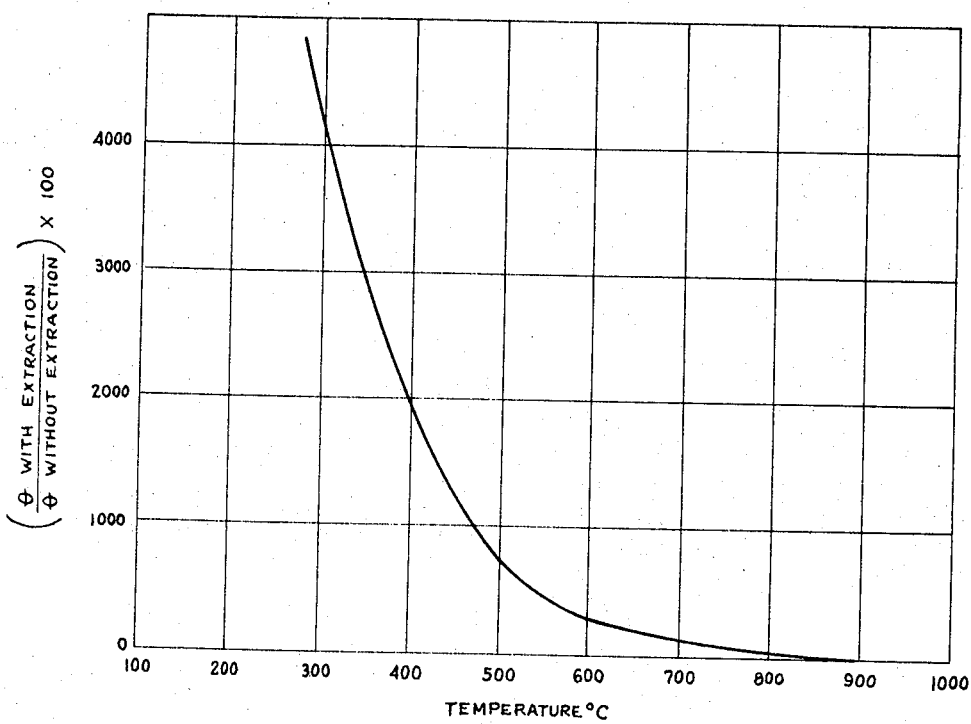
FIGURE 4 is a graphic presentation of the percent improvement in the efficiency of operation obtained by the present process at increasing temperature of operation of the catalyst bed.

FIGURE 4 is a graphic presentation of the percentage of improvement in efficiency of hydrocarbon conversion to hydrogen by use of abstraction of hydrogen in accordance with the present invention over a conventional steam conversion reaction at the same conditions except without abstraction. Here plotted against temperature is $$\frac{\theta \text{ with extraction}}{\theta \text{ without extraction}} \times 100$$

As will be explained more fully hereinafter, $\theta$ is indicative of efficiency of conversion and corresponds to the factor used for the vertical axis of the graphic presentation of FIGURE 3. As can be seen, the benefit to be gained by simultaneous abstraction of the hydrogen has been found to diminish rapidly as the temperature of operation approaches 500° centigrade since at temperatures above 600° centigrade, the conversion reaction without abstraction becomes reasonably efficient.

Figure 5:
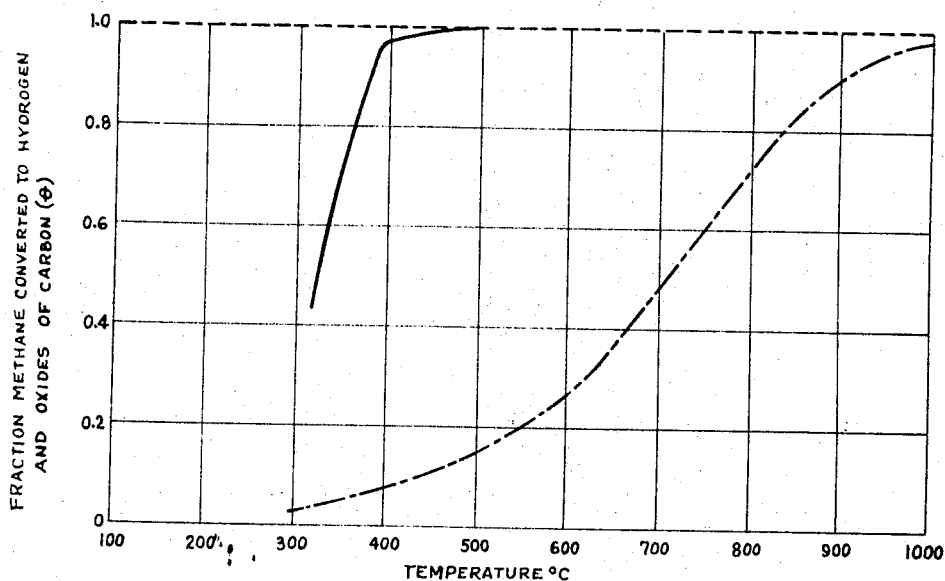
FIGURE 5 is a graphic presentation of experimentally derived test data on the operation of the present process and of the normal conversion curve and of the thoretical conversion curve assuming 100 percent efficiency of the process with hydrogen abstraction.

This observation is also shown in the graphic presentation of FIGURE 5. The factor $\theta$, or fraction of feedstock (here methane) converted to hydrogen and oxides of carbon, is again plotted against temperature. The horizontal dotted line represents the maximum possible conversion of feedstock with absolute efficiency of simultaneous hydrogen abstraction in a reasonably static spatial situation to drive the equilibrium constantly to favor hydrogen production. The right hand curve is a plot of the maximum conversion of the methane feed possible without simultaneous abstraction when the steam reforming reaction is conducted at 300 p.s.i.a. The solid line curve is a plot of actual values obtained with a methane feedstock at 300 p.s.i.a using simultaneous abstraction of hydrogen. As can be seen, the curve steeply climbs to approach theoretical efficiency at about 510° centigrade.

Although it would appear that use of simultaneous abstraction at temperatures about 515° centigrade would be desirable to ensure maximum efficiency, the temperature of operation of conversion is not the most advantageous for operation of the diffusion membrane. The tubular membranes deteriorate rapidly as the temperature is elevated above about 515° centigrade so that operation of a unit for extended periods of time is not practical without provision for periodic replacement of the relatively costly diffusion membranes. Moreover, it can be seen from FIGURE 4 that the advantage to be gained by the more costly reactor assembly rapidly diminishes with increase in temperature.

By operation of the process of the present invention with its low temperature range, it has been found that the conversion units operate with a high degree of conversion efficiency as seen in FIGURE 5 and for extended periods of time. Thus, the process can be utilized in portable equipment or highly compact equipment without excessive amounts of insulating media or expensive high temperature components. The diffusion membranes can be utilized efficiently at lower temperatures to avoid deterioration thereof and the need for cooling means can be reduced.

For a greater understanding of the process of the present invention, an explanation of the factors involved is here provided. As is well known, catalytic dehydrogenation or reformation of hydrogen-containing carbonaceous feedstocks generally produces a series of reactions, with variation in feedstock and operating conditions tending to favor one or more of the reactions. From the standpoint of hydrogen production, two reactions are primarily of concern as described with respect to methane:

$$CH_4 + H_2O \rightleftharpoons CO + 3H_2$$

$$CH_4 + 2H_2O \rightleftharpoons CO_2 + 4H_2$$

As is also well known, these reactions are reversible and and tend to reach an equilibrium for a given set of process conditions with the equilibrium tending to shift to the right with increase in temperature but increasing temperature has a tendency toward increasing carbon formation according to the reaction:

$$CO_2 + 2H_2 \rightleftharpoons C + 2H_2O$$

By conducting the dehydrogenation reaction at the one surface of a tube selectively permeable to hydrogen, the hydrogen produced in the reaction can immediately diffuse through the wall of the tube and thus reduce the partial pressure of hydrogen in the reaction products, thus causing the equilibria first described above to shift to the right, i.e., toward increased hydrogen production. Not only is a pure hydrogen product obtained directly from the reaction site but also the increased efficiency of the hydrogen-forming reaction enables the use of lower temperatures than heretofore considered desirable for minimal efficiency of the conversion reaction. The use of lower temperatures is considered desirable because the tendency toward carbon formation can be reduced and there are considerably lesser problems in fabrication and operation of the conversion unit as well as a generally longer life expectancy for the unit. Because of the favorable reaction equilibria, lesser steam ratios are required than heretofore most generally employed so as to permit reduction in the steam to carbon ratio to somewhat above the stoichiometric ratio; in this manner, the volume of the gaseous stream may be reduced for a given amount of hydrogen produced or higher molecular weight carbonaceous feedstocks may be employed.

The effect of simultaneous isothermal hydrogen abstraction has been determined theoretically by use of a thermodynamic calculations run on a computer at various sets of conditions. At each temperature level, the effect of continuous abstraction of hydrogen during the reforming process is the generation of additional hydrogen. At elevated temperatures on the order of 870 to 980° centigrade, the methane initially has been almost completely converted to CO, $CO_2$ and $H_2$, and the generation of additional hydrogen results from the effect of abstraction driving the following reaction toward the right.

$$H_2O + CO \rightleftarrows CO_2 + H_2$$

At lower temperatures, the primary effect of the hydrogen abstraction is to drive the following two reactions to the right.

$$CH_4 + H_2O \rightleftarrows CO + 3H_2$$

$$CH_4 + 2H_2O \rightleftarrows CO_2 + H_2$$

At each temperature, the effect of increased pressure is to reduce the extent of reaction, which effect is particularly pronounced at lower temperatures. This can be appreciated by noting that increasing pressure will drive the second and third reactions to the right, while not affecting the first reaction.

Moreover, at each temperature level, a limiting value is reached beyond which the removal of hydrogen cannot extend. This results from the fact that the reaction products are essentially $H_2O$, $CO_2$ and CO.

The following equations are established using reference characters and basing the calculations on one pound mole of methane fuel:

$$\phi = \frac{\text{feed ratio moles of } H_2O}{\text{mole of } CH_4}$$

$$\theta = \frac{\text{moles CO} + \text{moles } CO_2}{\text{moles CO} + \text{moles } CO_2 \text{ moles } CH_4}$$

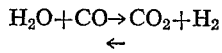

$$\psi = \frac{\text{moles } CO_2}{\text{moles CO} + \text{moles } CO_2}$$

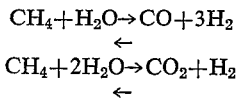

$$\epsilon = \frac{\text{moles } H_2 \text{ abstracted}}{\text{moles } H_2 \text{ present in feed mixture}}$$

Basis of calculation: 1 lb. mole of $CH_4$ feed.

(1)  total moles of feed $= 1 + \phi$ (2)  moles of $CH_4$ remaining at any $\epsilon = 1 - \theta$ (3)  moles of $CO_2$ formed at any $\epsilon = \theta\psi$ (4)  moles of CO formed at any $\epsilon = \theta(1 - \psi)$ (5)  moles of $H_2$ formed at any
$$\epsilon = 3\theta(1 - \psi) + 4\theta\psi = \theta(3 + \psi)$$

(6)  moles of $H_2$ remaining in gas mixtures at any
$$\epsilon = \theta(3 + \psi) - \epsilon(2 + \phi)$$

(7)  moles of $H_2O$ in feed $= \phi$ (8)  moles of $H_2O$ remaining at any
$$\epsilon = \phi - \theta(1 - \psi) - 2\theta\psi = \phi - [\theta + \theta\psi]$$

Total moles of gas remaining at any
$$\epsilon = \Sigma \text{ items } (2) + (3) + (4) + (6) + (8) = (1 - \theta) + \theta\psi + [\theta(1-\psi)] + [\theta(3+\psi) - \epsilon(2-\phi)] + [\phi - (\theta + \theta\psi)]$$

$$\text{mole fraction } CH_4 = \frac{1 - \theta}{1 + 2\theta + \phi - \epsilon(2 + \phi)}$$

$$\text{mole fraction } CO_2 = \frac{\theta\psi}{1 + 2\theta + \phi - \epsilon(2 + \phi)}$$

$$\text{mole fraction } CO = \frac{\theta(1 - \psi)}{1 + 2\theta + \phi - \epsilon(2 + \phi)}$$

$$\text{mole fraction } H_2 = \frac{\theta(3 + \psi) - \epsilon(2 + \phi)}{1 + 2\theta + \phi - \epsilon(2 + \phi)}$$

$$\text{mole fraction } H_2O = \frac{\phi - \theta(1 + \psi)}{1 + 2\theta + \phi - \epsilon(2 + \phi)}$$

The efficiencies of the process and actual plots of operation are graphically presented in FIGURES 3–5 of the attached drawings as previously indicated.

Although it has been suggested that the catalyst might comprise a catalytic coating formed upon the surface of the tubes of hydrogen-permeable metal such as palladium-black coating, it has been observed that much greater surface area for the dehydrogenation reaction is provided by use of a granular catalyst packed within the tubes or about the exterior of the tubes so as to ensure a high degree of contact between the reactants and the catalyst. Similarly, to obtain a high degree of hydrogen abstraction from the reaction site, the distance from the catalyst to the adjacent surface of the tube should not be greater than about 0.25 inch and preferably on the order of 0.063 of an inch.

The tubes may assume a variety of configurations to facilitate the abstraction depending upon the cross-sectional dimension thereof. From the standpoint of ease of fabrication, tubes of round cross-section are most conveniently employed; however, longitudinally finned tubing may provide advantages of greater surface area for abstraction and more intimate contact with the catalyst by its location between the fins or protuberances.

Various hydrocarbonaceous fuels may be employed in the present process including paraffins, olefins, aromatics, and alcohols containing from one to about sixteen carbon atoms. The preferred fuels are lower molecular weight hydrocarbons containing one to eight carbon atoms such as methane, ethane, propane, butane, pentane, hexane, and combinations thereof and with relatively small amounts of unsaturated hydrocarbons.

The temperatures employed may vary from about 175° centigrade to about 510° centigrade depending upon the catalyst and pressures; and the pressures may include slightly negative pressures but normally will range from 0 to 500 pounds per square inch absolute depending upon the activity of the catalyst and the process conditions. Since the hydrogen abstraction enables the use of lower temperatures with relatively high efficiency, it is generally desirable to employ temperatures of about 230 to 480° centigrade. Although negative pressures can be employed if sufficient vacuum is applied to draw out the hydrogen from the opposite side of the tube and maintain a pressure differential and although high pressures can be accommodated by the proper fabrication of the components, ease of fabrication and operation favors the use of pressures on the order of 0 to 300 p.s.i.a.

Because of the enhanced equilibrium factors, relatively low steam-to-carbon ratios may be employed, i.e., approaching the stoichiometric ratio of 2.0:1. Generally, the ratios employed are about 2.0 to 4.0:1. The catalysts may comprise any of the conventional dehydrogenation catalysts such as nickel, cobalt and platinum.

Although various materials exhibit varying degrees of selective permeability to hydrogen, the noble metals platinum and palladium, and their alloys, have enjoyed primary acceptance in thin films. However, problems in fabrication and hydrogen embrittlement have led to primary utilization of palladium alloys containing silver or boron. The preferred tubular elements are those fabricated from a palladium alloy containing about 25 percent by weight silver. Generally, the wall thickness will vary with the pressures employed in the process in the range of about 0.1 to 6.0 mils. For atmospheric and low superatmospheric pressures, a preferred thickness from the standpoint of speed and reliability of fabrication and operation is about 0.5 to 3.5 mils, it being understood that there should not be so great a pressure differential between the opposite surfaces of the tubes as to produce rupturing thereof.

The theoretical hydrogen space velocities employed will, of course, vary with the activity of the catalyst, the temperatures, the pressure, and the feedstock within the range of about 100 to 10,000 hours$^{-1}$. Generally, space velocities of about 1,000 to 8,000 hours$^{-1}$ are preferred.

Illustrative of the efficiency of the present invention is the following specific examples:

EXAMPLE 1

A reactor similar to that illustrated in FIGURES 1 and 2 was utilized having a tube length of about 23.8 inches and an outside diameter of 0.0627 inch with a wall thickness of 0.003 inch. The reaction chamber was 1.049 inches in diameter and 84 tubes were arranged therein at spacing of about 0.090 inch on centers. Packed between the tubes in the reaction chamber was 175 grams of a proprietary nickel catalyst sold by Girdler Catalyst Company under the designation "G–56" which had an average particle size of 0.013 inch and had been reduced by hydrogen at 370° centigratde.

The hydrocarbonaceous feedstock employed was a commercial methane mixture having the following typical analysis:

| Component: | Mole percent |
| --- | --- |
| Methane | 93.63 |
| Carbon Dioxide | 0.70 |
| Nitrogen | 0.47 |
| Ethane | 3.58 |
| Propane | 1.02 |
| Isobutane | 0.21 |
| Normal Butane | 0.19 |
| Isopentane | 0.06 |
| Normal Pentane | 0.06 |
| Hexane | 0.02 |
| Heptane plus | 0.06 |

To the inlet was fed a gaseous admixture of 0.25 pound per hour water and .0765 pound per hour of the methane mixture (a molar water-to-carbon ratio of 2.91) at a temperature of about 450° centigrade. The reactor was heated so that a thermocouple at the bed at about the center of the reaction chamber registered a temperature of 510° centigrade while the average wall temperature was 570° centigrade. The pressure in the reactor was maintained at 275 pounds per square inch gauge.

Pure hydrogen was extracted from the tubes at the rate of 0.0324 pound per hour while the total available hydrogen in the gaseous stream was only 0.0467 pound per hour, thus indicating a high degree of conversion efficiency. An analysis of the effluent from the reactor indicated that 99.3 percent of the methane had been reacted and the molar ratio of $CO_2$ to $CO_2+CO$ was 0.95.

Reference to the graph of FIGURE 3 shows that a conversion efficiency for methane of 99 percent without the hydrogen abstraction of the present invention would require a temperature of 982° centigrade.

EXAMPLE 2

The process of Example 1 is substantially repeated utilizing a methane feedstock and a temperature in the catalyst bed of about 399° centigrade and a pressure of about 280 p.s.i.g. The methane flow rate is 0.03 pound per hour and the molar ratio of steam to carbon is 2.0.

Upon determination of the hydrogen produced from the reactor and the effluent product, it is found that 98 percent of the methane has been converted to hydrogen and carbon oxide products without production of carbon. In contrast, is can be seen that the maximum conversion of methane to carbon oxide products and hydrogen would be approximately 14 percent without simultaneous hydrogen extraction at the termination of operation.

EXAMPLE 3

The process of Example 1 is substantially repeated with a methane feedstock using a steam-to-carbon molar ratio of 2.7. The temperature in the catalyst bed is about 315° centigrade and the pressure is 285 p.s.i.g. The methane flow rate is 0.051 pound per hour.

Analysis of the hydrogen produced and the effluent stream indicates that 45 percent of the methane feed is converted to carbon oxide products and hydrogen. No carbon formation is noted in the bed. From the graphic presentation, it can be seen that the conversion of methane to carbon oxide products and hydrogen without abstraction at this temperature would be only about 3 percent.

Thus, it can be seen that the present invention provides a novel and relatively highly efficient method for producing substantially pure hydrogen from hydrogen-containing carbonaceous feedstocks. The method is adapted to operation at relatively low conversion temperatures to provide relatively high conversion efficiency to enable wide use of catalytic reformation in relatively compact and long-lived apparatus.

Having thus described the invention, we claim:

1. In the method of producing hydrogen from a hydrogen-containing feedstock, the steps comprising: passing a gaseous stream comprising a mixture of a hydrogen-containing carbonaceous feedstock and steam into contact with a bed of granular dehydrogenation catalyst for said feedstock disposed about one surface of a tubular membrane formed from a metal selectively permeable to hydrogen at conditions sufficient to dehydrogenate an appreciable portion of said feedstock, the molar ratio of steam to carbon in said mixture being about 2.0–4.0:1.0, said conditions including a temperature of about 175–515° centigrade, a pressure of about 0 to 500 p.s.i.a. and a space velocity of about 100 to 10,000$^{-1}$ hours, the distance between any point of granular catalyst in said bed to one surface of said membrane being not greater than about 0.25 inch and said temperature being selected with respect to the metal of said membrane to minimize thermal deterioration thereof; continuously supplying additional gaseous stream to said catalyst to produce continuing catalytic dehydrogenation of the hydrogen-containing feedstock therein with the hydrogen produced thereby diffusing through the wall of said membrane to the other surface thereof; and removing substantially pure hydrogen from the other surface of said membrane to keep the pressure of hydrogen thereat below that at the said one surface of said membrane, said withdrawal and diffusion shifting the equilibrium of reaction in said catalyst thereabout to favor increased hydrogen production.

2. The method in accordance with claim 1 wherein said metal of said membrane is selected from palladium and its alloys.

3. The method in accordance with claim 1 wherein said temperature is about 230–480° centigrade and said pressure is about 14–300 p.s.i.a.

4. The method of claim 1 wherein said catalyst and a multiplicity of said tubular membranes are disposed in a reaction chamber, said catalyst being disposed about the outer surface of said tubes and said tubes having their ends sealed to said stream and wherein the hydrogen diffuses through the walls of said tubes to the inner peripheral surface thereof and is withdrawn from the interior of said tubes.

5. The method in accordance with claim 1 wherein said catalyst and a multiplicity of tubular membranes are disposed in a reaction chamber, said catalyst being disposed within said tubular membranes and said gaseous steam being fed to the interior of said tubular membranes and wherein the hydrogen diffuses through the walls of said tubular membranes to the outer peripheral surface thereof and is withdrawn from the chamber about the outer peripheral surface of said tubular membranes.

References Cited

UNITED STATES PATENTS

| | | | |
|---|---|---|---|
| 3,198,604 | 8/1965 | Pfefferle | 23—212 |
| 3,251,652 | 5/1966 | Pfefferle | 23—213 |
| 3,278,268 | 10/1966 | Pfefferle | 23—212 |
| 3,290,406 | 12/1966 | Pfefferle | 23—212 XR |
| 3,254,956 | 6/1966 | Hunter | 23—212 |
| 3,259,523 | 7/1966 | Faris et al. | 23—212 XR |

FOREIGN PATENTS 981,275    1/1965    Great Britain.

EDWARD STERN, *Primary Examiner.*

U.S. Cl. X.R.

23—288; 252—373; 260—683.3